United States Patent

[11] 3,633,864

| [72] | Inventor | Herscheal W. Miller |
| | | 432 Fairmount St., Davenport, Iowa 52806 |
| [21] | Appl. No. | 3,715 |
| [22] | Filed | Jan. 19, 1970 |
| [45] | Patented | Jan. 11, 1972 |

[54] ADJUSTABLE SEAT SUPPORT
4 Claims, 4 Drawing Figs.

[52] U.S. Cl. .................................................. 248/419
[51] Int. Cl. ..................................................... F16m 13/00
[50] Field of Search .......................................... 248/178, 399, 419, 421, 424

[56] References Cited
UNITED STATES PATENTS

| 3,075,736 | 1/1963 | Freedman ..................... | 248/419 X |
| 3,188,044 | 6/1965 | Epple ........................... | 248/419 |
| 3,319,920 | 5/1967 | Freedman et al. ............. | 248/399 |

FOREIGN PATENTS

| 508,151 | 6/1939 | Great Britain ................ | 248/419 |

*Primary Examiner*—William H. Schultz
*Attorney*—Henderson & Strom

ABSTRACT: A seat support for mounting a seat to a vehicle, the support adapted for independent and selective adjustments for regulating the height, fore-and-aft position and suspension of the seat. The support includes a base secured to the vehicle, a first adjusting unit pivotally connected to the base and operable to regulate fore-and-aft positioning of the seat relative to the base, a suspension unit pivotally connected to the first adjusting unit for cushioning the seat, a second adjusting unit pivotally connected to the suspension unit and operable to regulate vertical positioning of the seat relative to the base, and a mounting plate pivotally connected to the second adjusting unit for attaching a seat thereto.

PATENTED JAN 11 1972
3,633,864
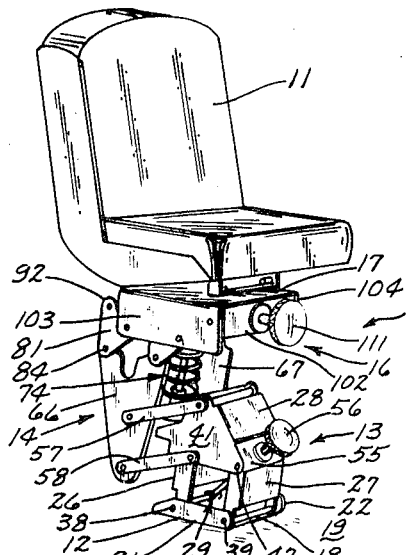
Fig. 1
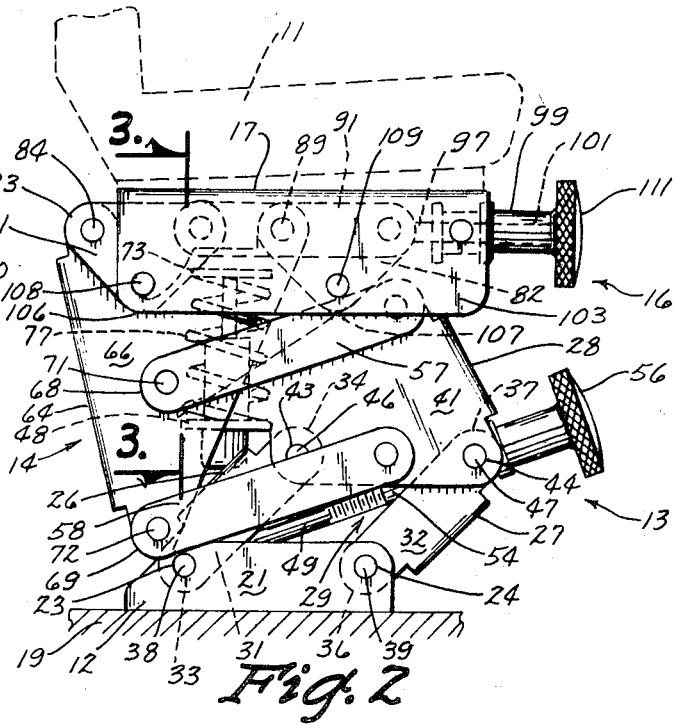
Fig. 2
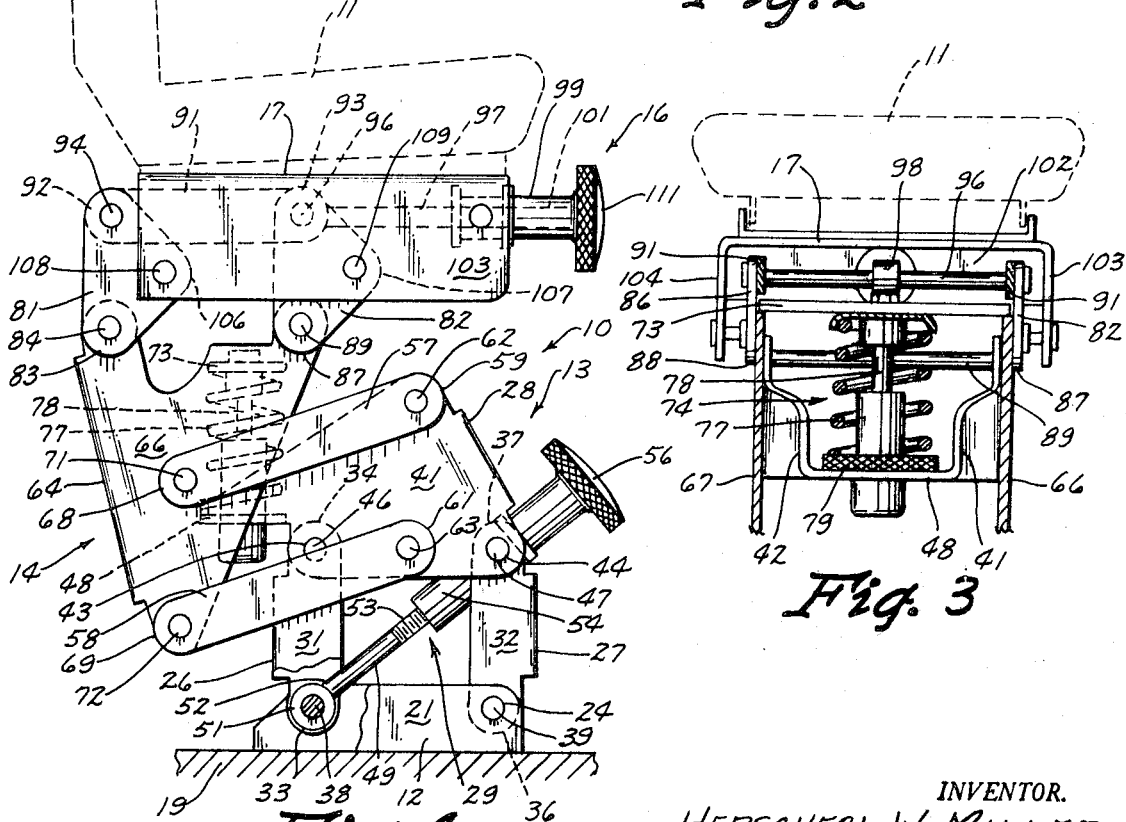
Fig. 3
Fig. 4
INVENTOR.
HERSCHEAL W. MILLER
BY
Henderson & Strom
ATTORNEYS

ADJUSTABLE SEAT SUPPORT

BACKGROUND OF THE INVENTION

This invention relates generally to adjustable seat supports for vehicles and particularly to an adjustable seat support for mounting an operator's seat to a work vehicle or implement.

In providing an adjustable seat support for vehicles such as tractors and farm combines, it is believed that the ideal seat support should include an independent fore-and-aft adjustment to position the seat to accommodate either a short or a tall operator; an independent vertical adjustment for substantially the same purpose; and a cushion suspension to adjustably cushion the seat to accommodate a light as well as a heavy operator comfortably.

Adjustable seat supports are known having vertical and horizontal adjustments and occasionally a seat-tilting adjustment. However, all of the known adjustable supports are designed primarily for automobiles adapted for travel over paved roads. Each of the known supports are vertically rigid since the cushioning effect of the seat is built into the vehicle suspension and seat and not into the support.

The known type of seat supports are unadaptable for vehicles designed primarily for use over dusty, rugged terrain due primarily to their sliding adjustment construction. Since the terrain is move bumpy in the natural travel of a vehicle of the type described, providing a cushioning support to absorb the shocks of travel thereover is more practically provided in the support then in the seat itself.

The adjustable seat support of this invention is designed to provide a novel vertical and horizontal adjustment for positioning the seat of a work vehicle and to be unaffected by the dirty, dusty conditions of the terrain commonly traveled. Likewise, the support is adapted to provide an adjustable cushion suspension to absorb greater shocks commonly associated with the more rugged terrain normal for this type of vehicle to travel.

SUMMARY OF THE INVENTION

An adjustable support for mounting a seat to a vehicle, the support including a base to fixedly secure the support to the vehicle, a first adjusting unit pivotally connected to the base and operable to horizontally position the seat relative to the base, a suspension unit pivotally connected to the first adjusting unit to cushion the seat, the support unit being reciprocally and freely movable in a substantially vertical plane, a second adjusting unit pivotally connected to the support unit and operable to vertically adjust the seat relative to the base, and a seat-mounitng plate pivotally connected to the second adjusting unit to secure the seat to the support.

It is an object of this invention to provide a novel adjustable seat support for mounting a seat to a vehicle.

It is another object of this invention to provide a seat support for a work vehicle that is independently adjustable to both vertically and horizontally position the seat.

It is a further object of this invention to provide an adjustable seat support for a work vehicle that is capable of cushioning the seat and of absorbing the shock to the operator resulting from the rough terrain, yet does not inhibit independent vertical and horizontal adjustments of the support.

It is yet another object of this invention to provide an adjustable seat support for a work vehicle that is unaffected by dusty, dirty conditions common to the normal terrain of operation of the vehicle.

It is still another object of this invention to provide an adjustable seat support for a vehicle that is simple in construction and use, economical to manufacture, and rugged in construction.

These objects and other features and advantages of the present seat support will become readily apparent upon reference to the following description when taken in conjunction with the accompanying drawings.

BRIEF DESCRIPTION OF THE DRAWINGS

FIG. 1 is a perspective view of the adjustable seat support of this invention shown in conjunction with a conventional vehicle seat;

FIG. 2 is an enlarged side elevational view of the support, showing some parts in broken lines for clarity of illustration;

FIG. 3 is a sectional view as taken along the line 3—3 of FIG. 2; and

FIG. 4 is a side elevational view similar to FIG. 2, with some parts broken away for clarity of illustration and showing the seat in raised and rearwardly disposed position.

DESCRIPTION OF THE PREFERRED EMBODIMENT

Referring now to the drawings and particularly to FIG. 1, the adjustable seat support of this invention is indicated at 10. The seat support 10 is illustrated with a conventional implement seat 11 connected thereto.

The seat support 10 generally comprises a base 12, a first adjusting unit 13 pivotally connected to the base 12, a suspension unit 14 pivotally connected to the first adjusting unit 13, a second adjusting unit 16 pivotally connected to the suspension unit 14, and a mounting plate 17 for securing the seat 11 pivotally connected to the second adjusting unit 16.

The base 12 (FIGS. 1 and 2) includes a relatively flat plate 18 appropriately secured to a floor panel 19, or the like, of the vehicle (not shown) by conventional bolt and nut fasteners (not shown). The plate 18 serves to secure the support 10 to the vehicle and includes a pair of upwardly flanged sides 21 and 22. The side 21 is provided with a pair of spaced apart holes 23 and 24 axially aligned with corresponding holes (not shown) in the opposite side 22.

The first adjusting unit 13 is designed to selectively adjust the fore-and-aft position of the seat 11 relative to the base 12. The unit 13 generally includes a pair of spaced parallel pivot plates 26 and 27, a connecting member 28, and an adjusting mechanism 29 for operating the unit 13.

The pivot plates 26 and 27 are mirror images of each other and include a pair of elongated parallel sides 31 and 32 respectively, only one side 31 and 32 of which is illustrated. The sides 31 and 32 are extended at each end 33, 34 and 36, 37 respectively thereof. The extended portions 33, 34, 36 and 37 are provided with holes (not shown). The plates 26 and 27 are pivotally connected to the base 12 by pivot pins 38 and 39 inserted through holes 23 and 24 formed in the sides 21 and 22 of the base 12 and the holes (not shown) formed in the lower ends 33 and 36 of the sides 31 and 32 respectively. The pivot plates 26 and 27 are thus relatively free to pivot about the axis of the pivot pins 38 and 39, restricted only by the adjusting mechanism 29, as hereinafter described.

The connecting member 28 includes a pair of parallel sides 41 and 42 (FIGS. 1, 2 and 4) having spaced apart holes 43 and 44 formed therein to receive pivot pins 46 and 47 traversing the holes (not shown) formed in the upper ends 34 and 37 of pivot plate sides 31 and 32 respectively. In this manner, the connecting member 28 is pivotally connected to the pivot plates 26 and 27 and is thus capable of fore-and-aft movement relative to the base 12 upon the pivot plates 26 and 27. The sides 41 and 42 extend rearwardly in side view, and are interconnected by crossmember 48, the purpose of which is hereinafter described. The crossmember 48 is a flat plate extending in a substantially horizontal plane.

The adjusting mechanism 29 (FIGS. 1, 2 and 4) includes a bolt 49 having a collar 51 secured to one end 52 thereof. The collar 51 is adapted to receive pivot rod 38 and thereby pivotally secures the bolt 49 to the base 12. The threaded portion 53 of the bolt 49 is adapted to appropriately engage a rotatable housing 54 having an internally threaded bore (not shown) to receive the bolt 49.

The housing 54 is rotatably connected to a crosspiece 55 disposed between pivot plate 27 and connecting member 28 and pivotally connected thereto by pivot pin 47. The housing 54 includes a serrated knob 56 for manual rotation thereof.

To operate the first adjusting unit 13, the knob 56 is rotated in one direction, i.e., counterclockwise, (FIG. 2) causing the bolt 49 to be screwed out of the housing 54 and thereby extend the adjusting mechanism 29. The extension of the mechanism 29 causes the pivot plates 26 and 27 to move angularly forward together with the connecting member 28, and attached seat 11. Conversely, rotating the knob 56 in the opposite direction, i.e., clockwise, causes a retraction of the bolt 49 into the housing 54 and a corresponding reversal of direction i.e., rearwardly, of the pivot plates 26 and 27, connecting member 28, and attached seat 11. It should be apparent to those skilled in the art that movement of the connecting member 28 and seat 11 is constrained by the bolt 49 and housing 54 in the absence of rotational movement of the housing 54.

The suspension unit 14 includes two pair of pivotal linkages 57 and 58 with only one linkage 57 and 58 of each pair being shown. One end 59 and 61 of the linkages 57 and 58 respectively is pivotally connected by pivot pins 62 and 63 respectively to the side 41 of the connecting member 28.

A vertical support 64 (FIGS. 1, 2 and 4) having a pair of parallel sides 66 and 67 is pivotally connected to the opposite ends 68 and 69 of the linkages 57 and 58 respectively by pivot pins 71 and 72. The sides 66 and 67 of the support 64 are substantially triangular in shape and extend downwardly in a vertical plane. The support 64 is pivotal upon the linkages 57 and 58 about the connecting member 28 in a substantially vertical plane. A cross-plate 73 extends between the sides 66 and 67 adjacent the support 64 for purposes hereinafter described.

The suspension unit 14 (FIG. 3) further includes a shock-absorbing mechanism 74 to suspend the vertical support 64 above the connecting member 28 upon the pivotal linkages 57 and 58. The mechanism 74 is disposed between the crossmember 48 of the connecting member 28, as hereinbefore described, and the cross-plate 73 of the support member 64.

The shock-absorbing mechanism 74 may include a coil spring 77 having a tension bolt 78 extended axially therethrough to adjust the tension of the spring 77 to compensate for the various weights encountered by the seat support 10. The bolt 78 is connected to each of the crossmembers 48 and 73 and includes an adjusting nut 79 for selectively expanding or compressing the spring 77, and thereby varying the tension exhibited by the spring 77. The spring 77 serves to absorb the vertical shock upon the seat 11 and operator by compression and to reciprocally restore the seat 11 to its original operating position. It is contemplated that the shock absorbing mechanism 74 may further include a conventional piston and cylinder shock absorber or conventional air spring.

The second adjusting unit 16 (FIGS. 1–4) includes two pair of coacting triangular plate brackets 81 and 82 pivotally connected to the support 64. Triangular bracket 81 and its counterpart (not shown) are aligned and one corner 83 is pivotally connected to respective sides 66 and 67 by pivot bar 84. Similarly, plate bracket 82 and its counterpart 86 (FIG. 3) are aligned and pivotally connected to sides 66 and 67 at corresponding corners 87 and 88 by pivot bar 89.

The plate brackets 81 and 82 are interconnected for simultaneous movement by connecting bar 91 pivotally connected to corresponding second corners 92 and 93 thereof respectively by pivot bars 94 and 96. A second bolt 97, similar to bolt 49, and collar 98 is connected to pivot bar 96. A second housing 99, similar to housing 54, and having an internally threaded bore 101 formed therein is rotatably connected to cross-bracket 102. The second housing 99 is adapted to engage the second bolt 97. The cross-bracket 102 is appropriately connected to seat mounting plate 17, as hereinafter described.

The seat mounting plate 17 is disposed in a substantially horizontal plane above the plate brackets 81 and 82 and includes a pair of downwardly flanged sides 103 and 104. The sides 103 and 104 are pivotally connected to the corresponding third corners 106 and 107 of the paired plate brackets 81 and 82 respectively by pivot pins 108 and 109. The flat portion of the mounting plate 17 is adapted to receive and secure the seat 11 to the seat support 10.

To raise and lower the seat 11 relative to the base 12, the second housing 99 is manually rotated by turning the serrated knob 111 provided therefore. By selectively rotating the housing 99 in the appropriate direction, the bolt 97 is threaded into or out of the housing bore 101 causing the triangular brackets 81 and 82 to pivot about the pivot bars 84 and 89 and to selectively raise and lower the seat mounting plate 17 and attached seat 11.

As best illustrated in FIGS. 2 and 4, drawing the bolt 97 into the housing 99 results in the triangular brackets 81 and 82 rotating clockwise about pivot bars 84 and 89 and a lowering of bracket corners 106 and 107 thereof respectively, causing the attached mounting plate 17 and seat 11 to lower. Conversely, extending the bolt 97 from the housing 99 results in the brackets 81 and 82 being rotated counterclockwise about their pivotal connection 84 and 89 to the support 64, causing the corners 106 and 107 to assume a higher position and raise the attached mounting plate 17 and seat 11.

An adjustable seat support 10 for a vehicle has thus been described having an independent adjustment 13 to move the seat 11 fore-and-aft relative to the base 12, an independent adjustment 16 to raise and lower the seat 11 relative to the base 12, and a suspension unit 14 capable of absorbing and cushioning the "road" shocks to the operator, the suspension unit 14 being provided with an adjustment member 79 to selectively regulate the suspension. The omission of sliding parts from the seat support 10 enables the seat support 10 of this invention to endure dusty or dirty conditions without failure of operation.

Although a preferred embodiment of the seat support of this invention has hereinbefore been fully described, it is to be remembered that various alterations and modifications can be made thereto without departing from the invention as hereinafter defined.

I claim:

1. An adjustable seat support comprising: an adjustable base assembly, a pair of vertical supporting plates pivotally connected to extend upwardly from said base assembly, and a horizontal seat-mounting plate pivotally connected to the upper edges of said vertical supporting plates, said adjustable base assembly comprising a baseplate, an upper connecting member, and a plurality of first bars pivotally connected to the sides of said baseplate and to the sides of said connecting member to form first parallel-bar linkages arranged to permit forward and rearward movement of said upper connecting member, an extensible adjustable member pivotally connected in a forward diagonal direction to said first parallel-bar linkages for adjusting the forward position of said upper connecting member, a plurality of second bars for pivotally connecting each of said vertical plates to said upper connecting member of said adjustable base assembly, said second bars, said vertical plates and said connecting member forming second parallel-bar linkages for permitting vertical movement of said vertical plates, a shock-absorbing mechanism connected to said second parallel-bar linkages to provide restrained cushioned vertical movement of said vertical plates, a plurality of third bars for pivotally connecting said seat mounting plate to the upper edges of said vertical supporting plates, said third bars, said mounting plate and said supporting plates forming third parallel-bar linkages, and means for rotating said third bars in unison to adjust the height of said seat mounting plate.

2. An adjustable seat support as claimed in claim 12 wherein said extensible adjusting member includes a bolt pivotally connected at one end to said base and a rotatable housing adapted to receive said bolt, a crosspiece connected across the front edges of said sides of said connecting member, said housing being rotatably secured to said crosspiece, said housing rotatable in one direction to move said pivotally supported seat mounting plate in a forward direction and rotatable in the opposite direction to move said mounting plate in a rearwardly direction.

3. An adjustable seat support as claimed in claim 12 wherein each of certain oppositely mounted ones of said third bars have an additional pivotal mounting point and said means for rotating said third bars include a transverse pivot rod interconnecting said additional pivotal mounting points of a pair of oppositely positioned ones of said bars, one end of said bolt being pivotally connected to said pivot rod, a bracket attached to the front portion of said seat-mounting plate, a housing rotatably mounted to said bracket and engaging the other end of said bolt, and said housing being rotatable to rotate said third bars for adjusting the height of said seat-mounting plate.

4. An adjustable seat support as claimed in claim 12 wherein said shock-absorbing mechanism includes a coil spring, a cross member connected between said vertical plates, said coil spring being mounted substantially vertically between said cross member and said upper connecting member of said base assembly, a tension bolt extending axially through said spring, and said bolt including a manually operable member to provide continuous adjustment of tension of said spring.

* * * * *